Nov. 12, 1968
SADAKICHI SUGIMURA
3,410,488
AUTOMATIC PERFUME ATOMIZER
Filed Dec. 20, 1965
7 Sheets-Sheet 1
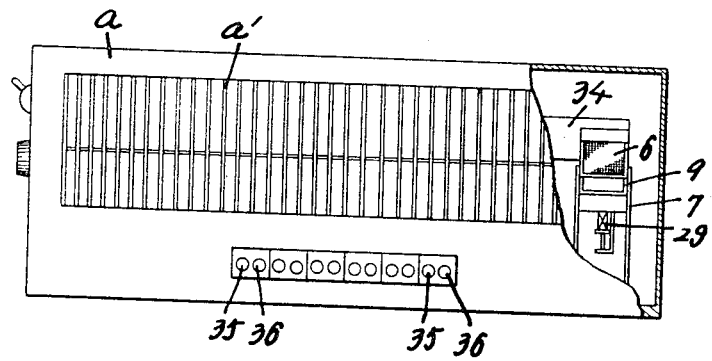
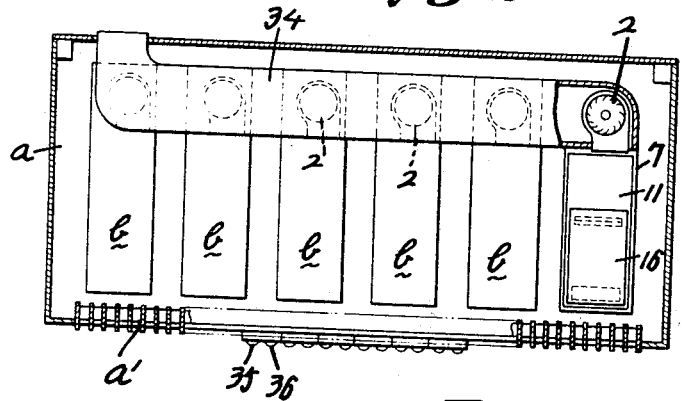
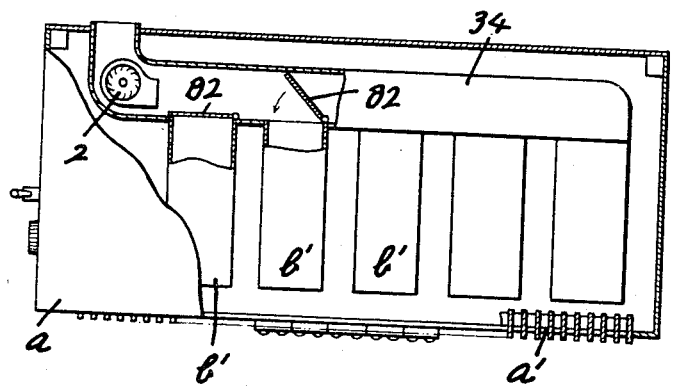
INVENTOR.
Sadakichi Sugimura
BY Ernest J. Montague
ATTORNEY

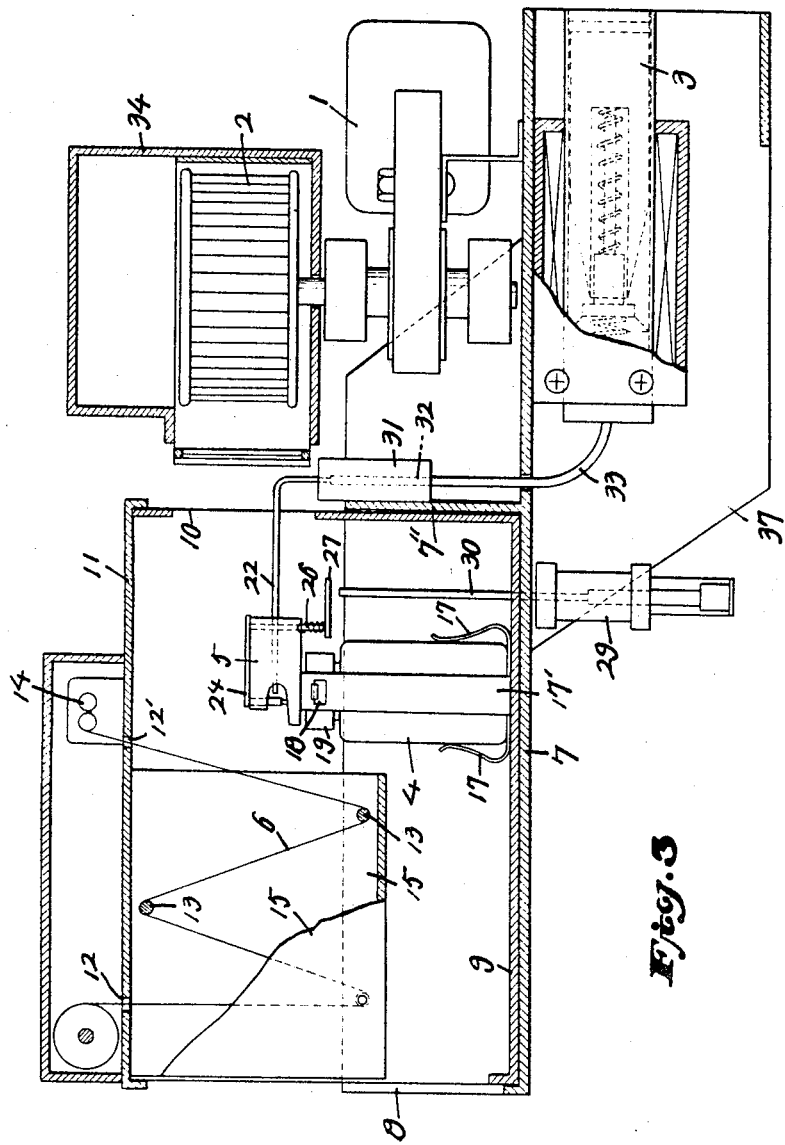

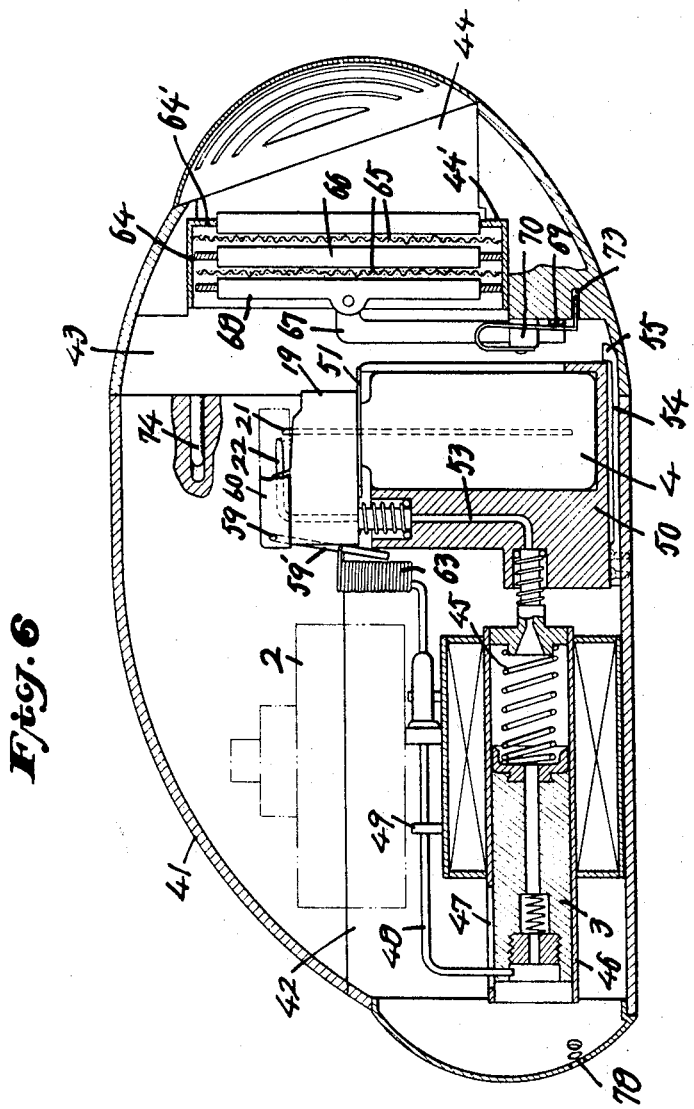

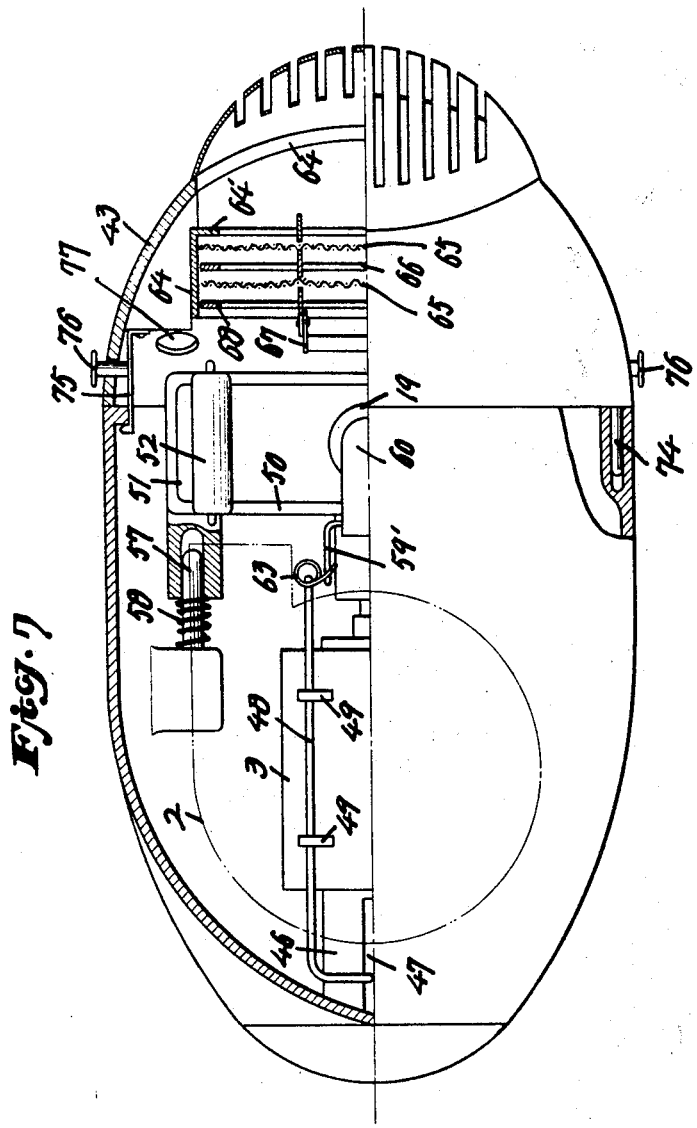

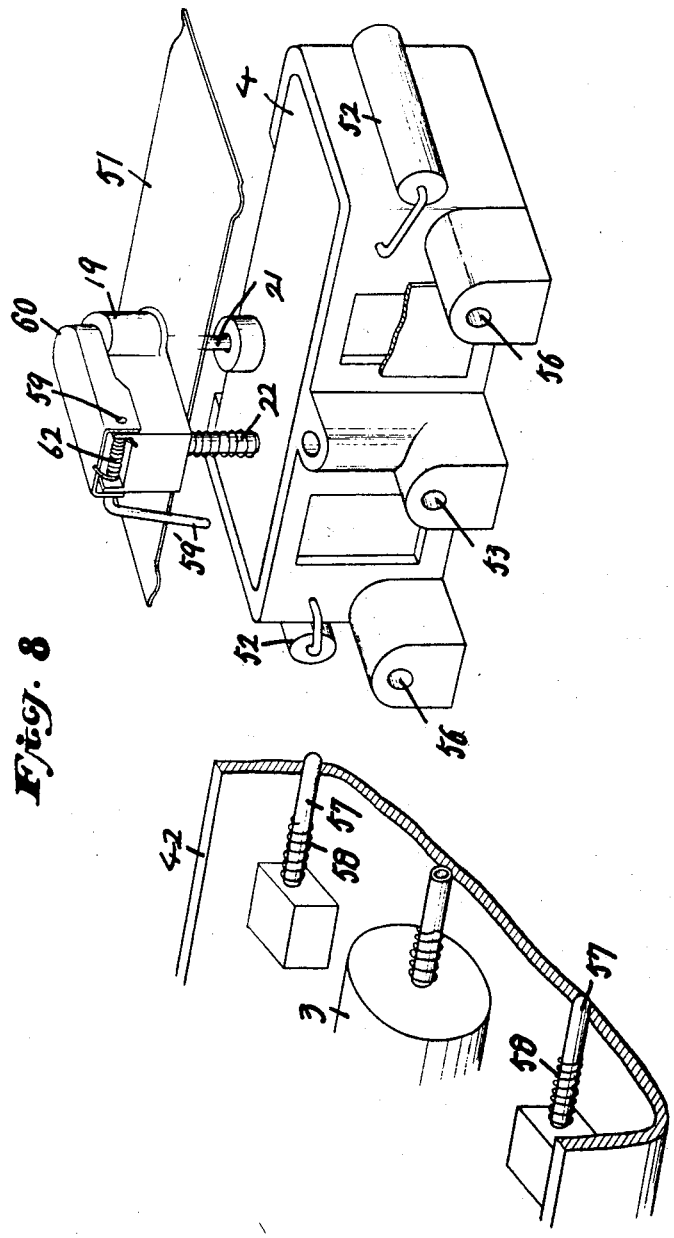

Nov. 12, 1968 SADAKICHI SUGIMURA 3,410,488
AUTOMATIC PERFUME ATOMIZER

Filed Dec. 20, 1965 7 Sheets-Sheet 7

INVENTOR.
Sadakichi Sugimura
BY

United States Patent Office 3,410,488
Patented Nov. 12, 1968

3,410,488
AUTOMATIC PERFUME ATOMIZER
Sadakichi Sugimura, 11 3-chome, Senbon-Midori-cho, Numazu-shi, Japan
Filed Dec. 20, 1965, Ser. No. 514,949
Claims priority, application Japan, Dec. 22, 1964, 39/72,078; July 28, 1965, 40/45,303, 40/45,304; Sept. 16, 1965, 40/56,325
9 Claims. (Cl. 239—55)

ABSTRACT OF THE DISCLOSURE

A perfume atomizing device by which a perfume spray is dispersed comprising a casing formed with a discharge outlet, means for holding a supply of perfume formed with the dispersion outlet within the casing, and a lid member for covering and uncovering the dispersion outlet. An electric operated air pump is provided for sucking perfume from the perfume holder through the dispersion outlet when the lid member uncovers the dispersion outlet. Means are provided for feeding an electric signal discontinuously to the air pump for discontinuously operating the air pump and simultaneously feeding an electric signal to actuate the lid member, so as to uncover dispersion outlet discontinuously and simultaneously when the air pump is operated. A fan is provided for continuously supplying currents of air adjacent the dispersion outlet for carrying and discharging the sucked perfume through the discharge outlet to outside of the casing, and a porous material is disposed between the discharge outlet and the dispersion outlet.

---

The present invention relates to a novel perfume atomizer having a material, such as gauze net, textile, etc. which is capable of passing therethrough flavor carried by air supplied in a wind-tunnel by a fan. It would be, particularly, utilized in producing a fine atmosphere, such as in a hotel lobby, salon, bed-room, cabin of a vehicle, etc.

Products similar to that of the present apparatus include conventional construction wherein a perfume bottle is built in the center of an electric fan. However, the fan adapted in the present apparatus is not for providing cool air but for supplying wind for dispersing perfume in the air and the construction and purpose of the present invention is quite different from the conventional apparatus.

It is an object of the present invention to provide a novel apparatus for achieving a pleasant atmospheric mood with an aromatic flavor.

It is another object of the present invention to provide an apparatus, wherein an aromatic flavor is dispersed into a porous material by means of a vacuum pump, and wherein the pump operates discontinuously, while the fan is continuously operated for supplying the aromatic fluid dispersed by an atomizing unit, and where, however, the consumption of the aromatic perfume is very small.

Further, the interval of such dispersion may be adjusted, e.g., seconds or 1 minute, as desired.

With these and other objects in view which will become apparent in the following detailed description, the present invention will be clearly understood in connection with the accompanying drawings, in which:

FIGURE 1 is a front elevation of several perfume atomizer units arranged in parallel within a casing for selecting a desired perfume therefrom, and showing the casing partly broken;

FIG. 2 shows a top plan view of the perfume atomizing unit with fans disposed within the casing partly in section;

FIG. 3 is a longitudinal sectional elevation of the perfume atomizer unit;

FIG. 6 shows a longitudinal sectional view of a perfume atomizer for application in vehicle or home use;

FIG. 7 is a plan view of the apparatus of FIG. 6 in which a sectional view thereof is partly shown;

FIG. 8 is an exploded fragmentary perspective view of the perfume atomizing unit of FIG. 6 removed from the casing;

FIG. 14 is a plan view showing a modification of the first embodiment partly in section.

Figure 5:
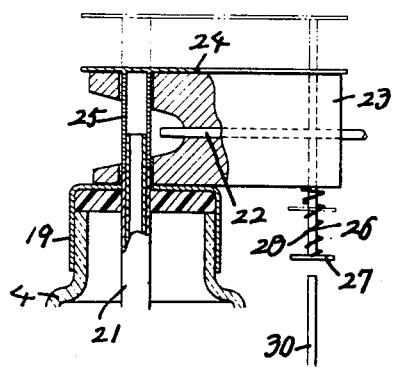
FIG. 5 is an enlarged fragmentary sectional view of the atomizer seal and the lid covering the atomizer of FIG. 3.
Figure 4:
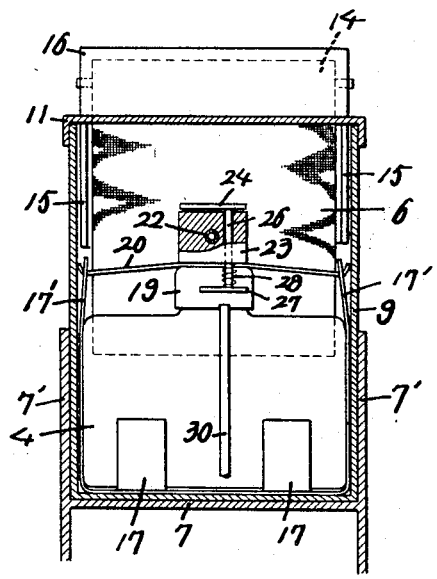
FIG. 4 is an enlarged fragmentary side view of the atomizer and perfume container of FIG. 3.
Figure 9:
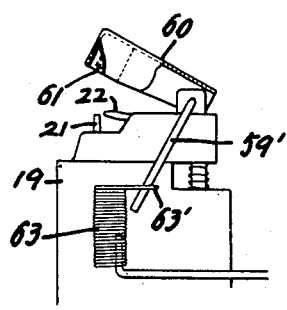
FIG. 9 is an enlarged side view illustrating the shutting and opening operation of the lid of the atomizing unit.
Figure 10:
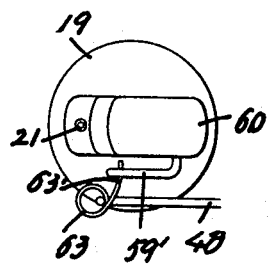
FIG. 10 is a top plan view of FIG. 9.
Figure 11:
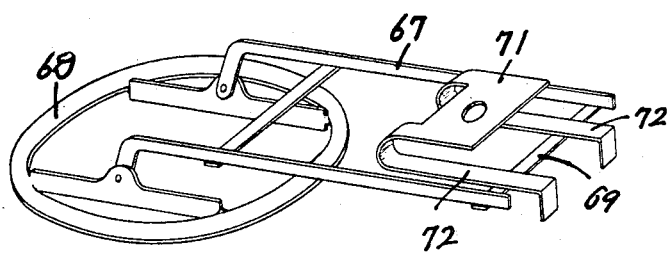
FIG. 11 is a perspective view of the base member on which an air porous material is provided.

Referring now to the drawings and more particularly to FIGS. 1 to 5, in a first embodiment, each atomizing unit *b* is provided in a casing *a* and substantially consists of a fan 2 operated by an electric motor 1, an air pump 3, magnetically operated, a perfume container 4, an atomizing mechanism 5 fitted to an outlet of the perfume container 4, and an air porous material 6 and roll which holds the material 6 and which is disposed in front of the atomizing mechanism 5 together with a base member 7 on which the respective mechanism is constructed.

The motor 1 connecting with the fan 2 is disposed in the rear part of the upper surface of the base member 7 and the air pump 3 is disposed in the rear part of the bottom surface of the base member 7.

On the upper surface of the base member 7, a side wall 7′ of low height is provided along both sides and a rear wall 7″ is connected to the side wall 7′, and a front wall having a low height is also provided at the front which opens into an outlet 8. A frame 9 is mounted in the portion being formed in the rear part into the side wall 7′, the rear wall 7″ and forming the outlet 8. The frame 9 has openings in the front and upper positions which consist of a window 10 at the rear end positioned against windoutlet of the fan 2.

The upper surface of the frame 9 is covered with a lid plate 11 of which the front upper part is supported with the roll containing the air porous material 6. The material 6 extends such, that it reaches a roll 14 through a slit 12′ provided in the lid plate 11 and through a turn-roll 13. The turn-roll 13 is provided transversely between lid plates 15 along the inside surface of the frame 9.

A winding roll 14 is specially provided for replacing the air porous material in case formerly used material is required to be changed, obviating any complications for replacing the material 6.

The upper part of the lid plate 11 is preferably covered with another lid 16.

The perfume container 4 having the atomizing mechanism 5 on the top thereof is mounted in the bottom part of the frame 9 being located between the window 10 and the air porous material 6. The atomizing mechanism 5 sprays the perfume on the air porous material 6 which moves up and down.

The perfume container 4 is disposed on the bottom part of the frame 9 being secured by plate springs 17, 17. Other plate springs 17′, 17′ extend upwardly having a hole 18 in the top thereof.

On both sides of a seal member 19 of the perfume container 4, an arm 20 (FIG. 4) of which both ends form an angle connecting with holes 18, 18 secure the perfume container 4 on the base member 7.

Namely, the perfume container 4 is removable by taking the arm 20 off the plate springs 17', 17'. Also the seal member 19 is separated from the container 4. Such atomizing mechanism 5 is, above all, fitted to the seal member 19.

The lower end of the atomizing mechanism 5 is fixed to the container 4 and the lower end nearly reaches to the bottom of the inside of the perfume container 4. Above the upper end of the seal member 19 is an air nozzle 22 and a pipe 21 passes through the seal member and transversly connects therewith for inspiring the perfume from the container 4, and the air nozzle 22 being held by the supporting member 23.

A plate member 24 is disposed on the upper part of the supporting member 23. The plate member 24 has a lid-cylinder 25 in the bottom part and the lid-cylinder 25 is disposed on the upper end of the inspiring pipe 21 passing through a longitudinal hole provided in the supporting member 23. The member 24 also has a leg 26 at the rear end and the leg 26 passes through the supporting member 23. A flange 27 is provided on the lower end of the leg 26 and a tension coil spring 28 is fitted on the leg 26 between the flange 27 and the supporting member 23.

Accordingly, the plate member 24 contacts the upper part of the supporting member 23 by the effect of the coil spring 28 and the lid-cylinder 25 is disposed on the upper end of the pipe 21.

On the surface of the base member 7, magnet 29 is provided so that the upper part of an elevating rod 30 is disposed adjacent the bottom end of the flange 27 by the effect of the magnet 29.

An interconnecting member 31 for communicating with the outlet of the air pump 3 and the air nozzle 22 is provided on the rear wall 7" of the base member 7. The interconnecting member 31 has an air passage 32 and the outlet of the air pump 3 connects, air tight, to the bottom end of the air passage 32. The rear end of the air nozzle 22 mounts into the upper part of the air passage 32. If an electric signal is sent to the air pump 3, compressed air instantly discharges from the air nozzle 22 through the pipe 33 and the interconnecting member 31, effected by magnetic operation.

The electric signal is, at the same time, given to the magnet 29. Accordingly, the flange 27 is pushed up by elevation of the rod 30 being effected by the magnet 29 and the lid-cylinder 25 moves off the pipe 21 as shown in FIG. 5, in dashed lines. Consequently, the perfume contained in the container 4 will be inspired out by the inhalation air discharged from the air nozzle 22 so that the perfume is dispersingly atomized to the air porous material 6. Upon termination of the electric signal, the air pump 3 causes the piston to move back to its starting position for preserving air so that the air will be discharged outside when it is caused to operate by the electric signal.

The magnet 29 has no further magnetic effect and as a result the upper end of the pipe 21 is covered as the coil spring 28 and the plate member 24 are lowered. Each fan 2 of each perfume atomizing unit is respectively disposed in the wind tunnel 34 (FIGS. 1 and 2) arranged in order.

The electricity will be, however, supplied discontinuously to the air pump 3 and the magnet 29, and the fan 2 is continuously operated independently from the circuit connected to the air pump 3.

Within the casing, for example, an electric switch, and a dial for adjusting time intervals, etc. may be provided.

In the front, selecting switches 35 of perfume atomizing units b and indicator lamps 36 thereof are respectively provided.

In this connection, if any optional perfume atomizing unit were placed in operative position by supplying electricity thereto, the indicator lamp 36 which connects the selected perfume atomizer unit will become illuminated and, at the same time, discontinuous operation for atomizing the perfume will be started through the fan 2, to which electricity is continuously supplied, and which selected perfume is allowed to pass out from the front through the air porous material 6 held within the frame 9, and therefore an aromatic air is atomized and passes through grill a'.

The respective units are, however, secured in the casing by legs 37 provided on the base member 7, and such unit can be easily taken out, if desired, from the casing by taking off the rear lid.

Namely, with such construction, repair and replacement of the air porous material 6 and maintenance of the present apparatus can be easily achieved.

In the present embodiment, it should be noted that such a construction in which the air porous material 6 such as, gauze, etc. to which a selected perfume is dispersed is blown on with the wind circulating from the fan 2, this will fairly prevent the mixture from the different flavors.

Referring now again to the drawings for another embodiment, and in particular to FIGS. 6 to 12, the construction of the apparatus is shown having a single perfume atomizing unit installed in a casing which is constructed with an upper and a lower divisional casing 41 and 42, respectively, together with a front lid 43, the front lid 43 being freely fixed. The casing also has discharge outlet 44 for passing atomizing perfume therefrom and the outlet 44 is surrounded with grill. A piston having packing at its end is pressed, being forced by a spring 45 through the magnetic effect of a magnet. An air pump 3 is installed in the bottom of the case.

On the upper part of a pump cylinder 46, a hole 47 is provided through which a rod 48 of the pump piston is projected. The rod 48 is curved toward the front side and passes through guide 49. A perfume container 4 is mounted in the front space provided in a base member 50. A seal member 19 which seals a mouth piece of the container 4 is constructed with a pipe 21 and an air nozzle 22. The seal member 19 is fitted to a plate member 51 which is disposed on the shoulder part of the seal member 19 and clamps 52, 52 for securing the perfume container 4 to the base member 50 by being pressed downwardly by the plate member 51. Accordingly, not only the perfume container 4 but also the seal member 19 can be released from the base member 50 if the clamps 52, 52 are released.

In the rear part of the base member 50, an air passage opening 53 shaped into an "L" is provided and the end of the air nozzle 22 curved downwardly is made to project from the air passage opening 53. Further, an outlet of the air pump 3 projects from the side from the air passage opening 53.

The base member 50 is disposed on a plate spring 54 of which the rear end is secured to the bottom of the case. The plate spring 54 has a stopper 55 curving upwardly.

On the base member 50, a hole 56 is respectively provided on both sides, and pins 57 with coil springs 58 are provided in the case for affixation into the holes 56.

Accordingly, on the base member 50 of the seal member 19 is operatively mounted and the perfume container 4 receives the outlet of the pump 3 through the air passage opening 53, and the base member 50 is further inserted so that the base member 50 passes rearwardly over the stopper 55 whereat the base member 50 is held in position even if the hands release. If the plate spring 54 is pressed downwardly the base member 50 will be released therefrom.

An axis 59 with a lid 60 is provided on the seal member 19. At the free end of the lid 60, a sponge like material 61 (FIG. 9) seals the openings of the pipe 21 and the nozzle 22. A coil spring 62 is wound on the axis 59. One end of the axis 59 extends to an arm 59'. The rod 48 which is fitted to the piston of the air pump 3 presses the arm 59' when the piston moves ahead, whereby the lid 60 is opened by the rotation of the axis 59.

In accordance with this embodiment, a coil spring 63 is hooked on the front end of the arm 59' and the end part 63' (FIG. 9) of the spring 63 contacts with the arm 59'.

That is the mechanism moves the piston ahead even if the rear end of the lid 60 reaches its maximum position ready for opening. Accordingly, the lid 60 will open the perfume atomizing device for dispersing the perfume by such an effect such that air is discharged through the air nozzle 22 by a piston-stroke performed by the electric signal which is sent discontinuously to the pump.

Further, upon termination of the electric signal the lid 60 automatically closes the perfume atomizing operation, being effected by the spring 62 since the rod 48 moves backwardly in cooperation with the backward movement of the piston for inspiring the air to the pump.

Within the circumferential surface of the dispersing outlet 44 provided in the front lid 43, a step 44' in which a cylindrical frame 64 is affixed is formed. In the cylindrical frame 64, an air porous material 65, such as a gauze, etc. is provided and each sheet of the air porous material 65 is separated by a separator 66, so that a certain space can be maintained.

Further, an arm 67 is rotatably fixed on the reversed surface of the front lid 43 and a packing frame 68 is also provided at the front end of the arm 67. The arm 67 is allowed to rotate between the cylindrical frame 64 pressed to the step 44' releasing the packing frame 68 from the cylindrical frame 64.

In accordance with the present embodiment, the arm 67 forms a ladder type and is fixedly pressed to the reverse side of the front lid 43 by a plate 69 with plate springs 72. The springs are fitted to the plate 69 and are mounted on projecting portion 70 of the front lid 43.

Figure 12:
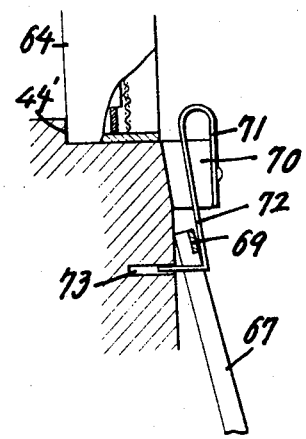
FIG. 12 is a fragmentary side view of an essential part of the device.

The two springs 72, 72 extended from plate 71 and are mounted into holes 73, 73 passing outer circumference of the projecting part 70. The plate 69 is held by the springs 72, 72 crossing under the projecting portion 70. Accordingly, arms 67 are in a first position in which the frame 68 is forcingly mounted to the cylindrical frame (FIG. 6) while, the arms 67 are, in case the other surface of the base plate is pressed, in a second position as shown in FIG. 12.

Replacement of the air porous material, such as gauze is achieved at the second position by removing the cylindrical frame 64 from the front lid. Further, the frame 68 is axially fixed to the end of the arms 67. The fan 2 which supplies the air to the air porous material 65 such as, e.g., gauze provided in the front lid 43, is secured on the air pump 3 for eliminating the disturbance for the movement of the rod 48.

Consequently, aromatic air can be atomized through the front grill by operating the fan 2 with appropriate adjustment of the time interval. In the present embodiment, several pins 74 are provided extending backwardly from the rear end surface of the front lid 43 for regulating the position for fixing into the front end surface, and plate springs 75 are fixed to the inside of both surfaces of the front lid 43, and the front end of the springs are hooked on the projected part, whereby the front lid can be easily removed by pushing buttons 76, projecting from both sides of the front lid 43.

Further, the level of the remaining perfume can be seen from a window 77 without releasing the front lid 43.

In this connection the perfume container 4 is made of transparent material such as, plastic, glass, or the like, and in addition, a lamp which illuminates the inside of the container is provided. The lamp illuminated only when the level of remaining perfume is checked.

Also, in the rear end, holes 78 for inspiring air are provided. Further, if a timer switch can not be built in the same case, the timer may be separated therefrom and the device will be controlled in a remote area.

Figure 13:
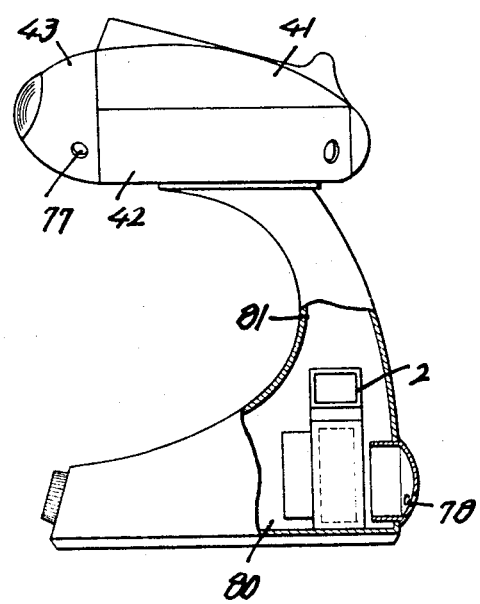
FIG. 13 is a partial side view showing a modification of the embodiment of FIGS. 6 to 12.

Referring now again to the drawings and in particular to FIG. 13, in accordance with a third embodiment there is shown a stand type which substantially consists of the aforesaid perfume atomizing device and fan 2 which is separated from the device.

The fan 2 is built in a base stand 80 and supplies the air through a hollow part 81 formed in the bottom thereof so that perfume which has been dispersed to the air porous material fixed to the front lid will be discharged to the air porous material fixed to the front lid will be discharged outside carried with the air.

In this stand type perfume atomizer, a transmitter may be built in the base stand 80 and the device may be utilized as a home ornament.

FIG. 14 shows a different modification of the first embodiment described herein, in which several atomizer units b' are built in one casing connecting the fan 2 through the wind tunnel 34.

To each air outlet, a valve 82 is provided which conducts air to a specific unit optionally selected by the user. Therefore, other valves not chosen by the user would not open; however, a plurality of valves may be opened at a time, if desired.

The present invention is not only restricted with such a particular type of devices mentioned above but also be utilized in any suitable apparatus, such as, radio, television, record player, furniture, etc.

While I have disclosed several embodiments of the present invention, it is to be understood that these embodiments are given by example only and not in a limiting sense, the scope of the present invention being determined by the objects and the claims.

What I claim is:

1. A perfume atomizing device by which a perfume spray is dispersed comprising:

a casing having at least one discharge outlet, at least one atomizing means for holding a supply of perfume and including a dispersion outlet within said casing, a lid member means for covering and uncovering said dispersion outlet, respectively, a porous material disposed between said dispersion outlet and said at least one discharge outlet, said at least one atomizing means for vaporizing perfume from said perfume holding means through said dispersion outlet onto said porous material, means for feeding an electric signal discontinuously to said at least one atomizer means for discontinuously operating selectively said at least one atomizer means, electric means operatively connected to said means for feeding an electric signal and for actuating said lid member means to uncover said dispersion outlet discontinuously and simultaneously with said discontinuous operation of said air pump means, and fan means for continuously supplying currents of air through said porous material for carrying and discharging said atomized perfume on said porous material through said at least one discharge outlet to outside of said casing.

2. The perfume atomizing device, as set forth in claim 1, wherein:

said at least one atomizer means includes an air pump means for passing air adjacent said dispersion outlet for sucking perfume from said perfume holding means through said dispersion outlet onto said porous material, and said means for feeding an electric signal, feeding said signal to said air pump means for discontinuously operating said air pump means.

3. The perfume atomizing device, as set forth in claim 2, wherein:
said air pump means is a magnetically operated air pump.

4. The perfume atomizing device, as set forth in claim 1, wherein:
said means for holding a supply of perfume is releasably mounted in said casing.

5. The perfume atomizing device, as set forth in claim 1, further comprising:
a roller mounted in said casing, and
said porous material being wound in part on said roller and extending adjacent said dispersion outlet.

6. The perfume atomizing device, as set forth in claim 5, wherein:
said roller is releasably secured in said casing.

7. The perfume atomizing device, as set forth in claim 1, wherein:
said means for holding a supply of perfume is transparent, and
said casing defines a window adjacent said means for holding a supply of perfume.

8. The perfume atomizing device, as set forth in claim 1, wherein:
said electric means including an electro-magnet for controlling said lid member.

9. The perfume atomizing device, as set forth in claim 1, wherein:
said air pump means for discharging compressed air adjacent said dispersion outlet simultaneously when said lid member uncovers said dispersion outlet.

References Cited

UNITED STATES PATENTS

| | | | |
|---|---|---|---|
| 1,220,969 | 1/1917 | Flanders | 261—80 X |
| 1,321,535 | 11/1919 | Marcovitz | 261—30 X |
| 1,322,804 | 11/1919 | Macfadden | 261—80 |
| 2,327,242 | 8/1943 | Boleom | 261—30 X |
| 2,462,001 | 2/1949 | Rapisarda | 239—35 X |
| 2,665,170 | 1/1954 | Schmitt et al. | 239—353 |
| 2,686,944 | 8/1954 | Gubelin | 239—70 X |
| 2,780,078 | 2/1957 | Teplitz | 261—80 X |

FOREIGN PATENTS

| | | |
|---|---|---|
| 365,865 | 1/1932 | Great Britain. |
| 111,968 | 8/1962 | Pakistan. |

M. HENSON WOOD, Jr., *Primary Examiner.*

V. M. WIGMAN, *Assistant Examiner.*